Patented Oct. 30, 1934

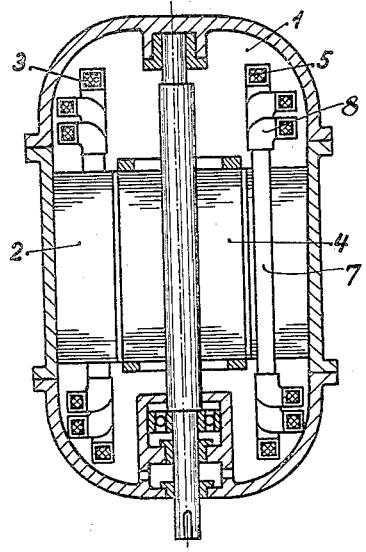
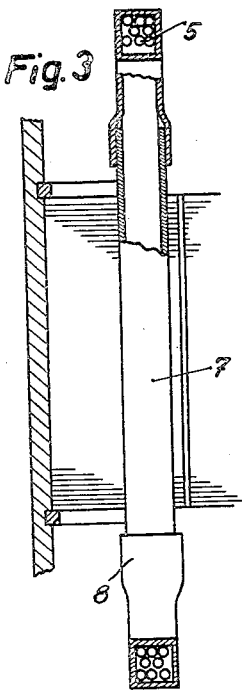
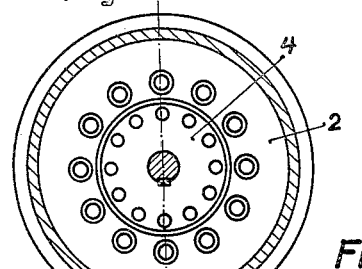
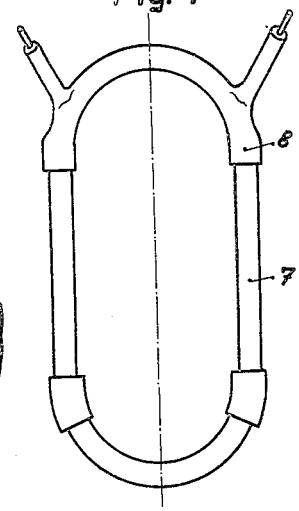
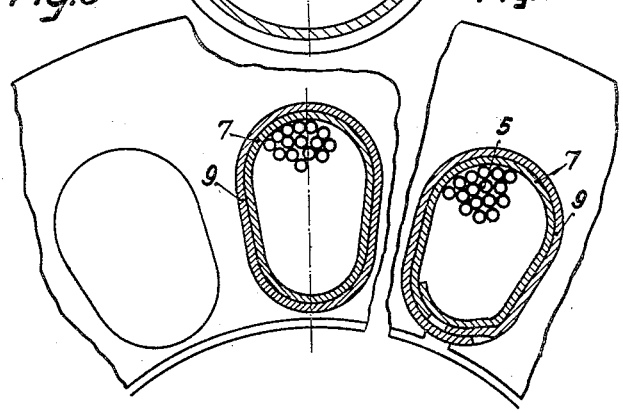

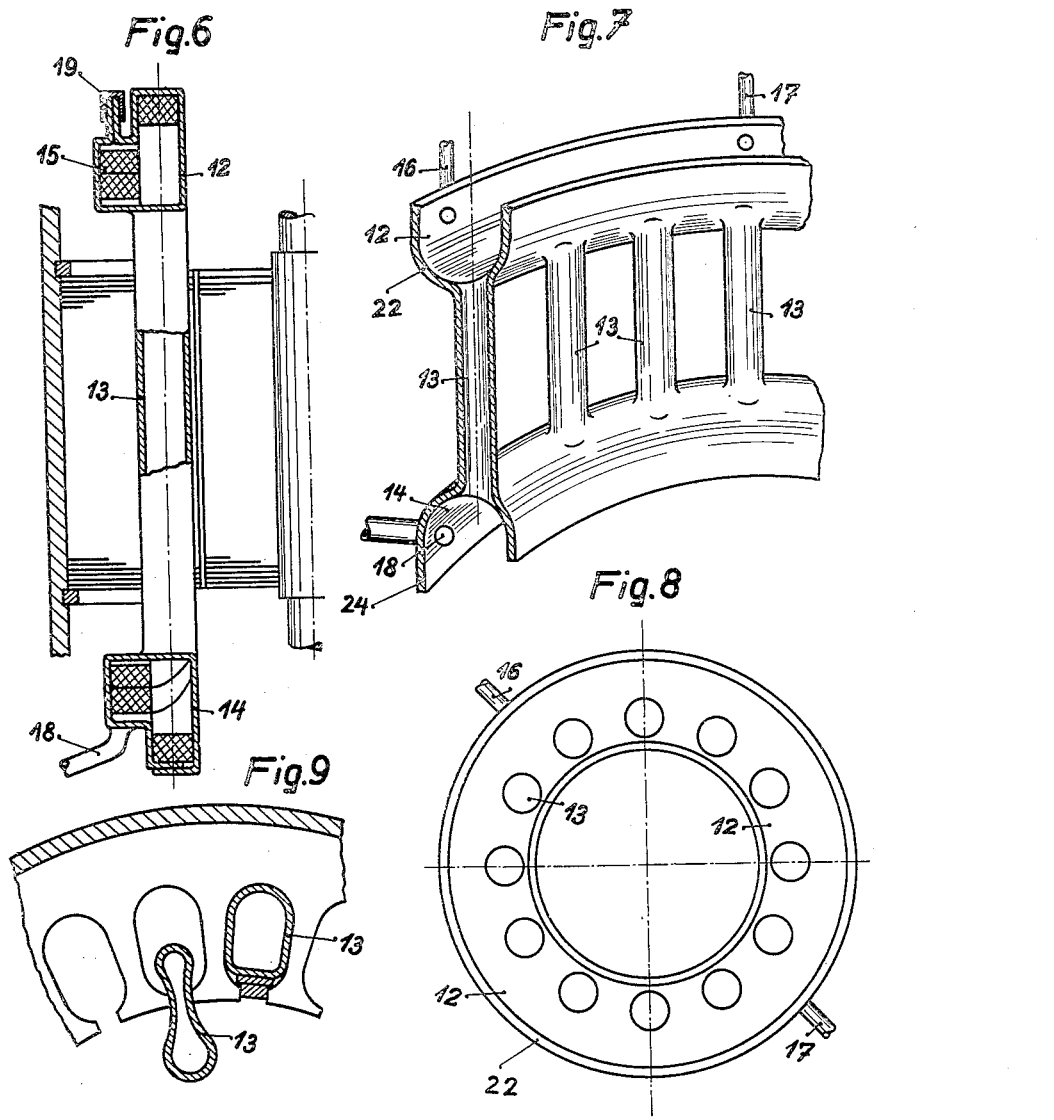

1,978,612

UNITED STATES PATENT OFFICE 1,978,612

LIQUID-TIGHT STATOR WINDING FOR A SUBMERSIBLE ELECTRIC MOTOR

Michael Surjaninoff, Stammersdorf, near Vienna, Austria, assignor to Sigmund Pumpen Bruder Sigmund, Olmutz-Luttein, Czechoslovakia, a corporation of Czechoslovakia Application January 20, 1933, Serial No. 652,647
In Austria February 16, 1932

5 Claims. (Cl. 172—36)

Electric motors are already known which are adapted to operate beneath the surface of a liquid, the liquid covering completely both the stator and the rotor. The stator winding of these known motors comprises prepared former-wound coils which themselves form liquid-tight units and which are mounted completely encased on the stator. This method of forming the winding, however, necessitates a comparatively large internal diameter, and it is impossible to use for this purpose a stator with closed slots, whereby the arrangement is impractical, particularly with longitudinally extended motors.

The present invention relates to a liquid-tight stator winding for submersible electric motors and is particularly applicable to motors having rotors of small diameters and which can be assembled directly on the stator. In accordance with the present invention the coil is introduced into a water-tight container which, prior to the winding operation, is mounted on the stator temporarily in an open condition and is closed up after the completion of the winding of the coil. The container consists of two portions, one of which comprises a plurality of tubes or troughs the number of which corresponds to that of the stator notches. The purpose of these tubes is to receive the notch connections. The second portion of the container is provided for the purpose of receiving the end connections. In accordance with one embodiment of the invention the second portion of the container is provided after the winding of the stator in the form of tubes. These tubes consist of a strip of unvulcanized or half-vulcanized rubber spirally wound on the end of the coil or of a trough surrounding the ends of the coil, the edges of which are overlapped and fastened together. The two portions of the container are joined together by vulcanizing. In accordance with a second embodiment of the invention the second portion of the container is constructed prior to the winding of the stator in the form of open end troughs joined with the notched tubes and which are closed up after the completion of the stator winding around the end connections.

The accompanying drawings illustrate a number of constructional examples of the invention:

Fig. 1 shows a longitudinal section, and
Fig. 2 shows a cross-section through one electric motor having a stator winding encased in a liquid-tight manner;
Fig. 3 is an enlarged showing, partly in longitudinal section, of the container for the windings,
Fig. 4 is a top plan view of a completely encased coil with its leads mounted on the stator, but without the laminated yoke,
Fig. 5 is a cross-section to an enlarged scale through a part of the stator with closed slots,
Fig. 5a is a similar cross-section through a part of the stator with half-open slots,
Fig. 6 shows in part longitudinal section another constructional example of motor,
Fig. 7 is a perspective view of a part of the insulating covering according to Fig. 6,
Fig. 8 is a plan corresponding to Fig. 7, and
Fig. 9 is a cross-section through a part of the stator of the motor to an enlarged scale.

As can be seen from Fig. 1, the motor 1 consists of a stator 2 provided with coil windings 3 and a squirrel-cage rotor 4. Each coil consists of normal insulated and impregnated wires 5, which are totally surrounded by a liquid-tight covering. Part of this covering is in the form of tubes 7, which are inserted, prior to the introduction of the winding, into the slots of the stator, the wire of the winding being then drawn through the tubes 7. The second part 8 of the covering is arranged around the end-connections of one or a plurality of coils, and is united with the first part 7 in a liquid-tight manner. This second container portion may, for instance, consist of a strip of unvulcanized rubber spirally wound on the end connections. When the strip of rubber is vulcanized a water-tight connection will be obtained between the spirals and the tubes or troughs inserted in the notches so that a water-tight container is formed which encases the stator windings. The part 8 of the container may be trough-shaped which surrounds the end connections and the edges of which may be lapped over one another and cemented or vulcanized so as to form a water-tight enclosure.

The portion of the container which projects above the stator connections may also be braided round with oakum 9 and impregnated with artificial resin so as to give the winding an outer surface as hard as glass.

As shown in Fig. 5, with closed slots the tubes 7 may be braided around with oakum and are inserted into the slots so as to project on both sides from the laminated yoke. In winding, the coil wires are drawn through these tubes, and bound at the ends as with normal coils.

With half-open slots as shown in Fig. 5a, the drawing through of the coil wires may be avoided by employing slot tubes which are slit along the side adjacent the slot gap, the coil wires being introduced in winding through the gap so formed. Subsequently, the edges of the slit in the tube are overlapped, and are joined together. The joining of the tubes forming the container and the joining of the overlapped slit edges of the tubes is accomplished by vulcanizing or any other suitable manner depending on the nature of the material used in the construction of the tubes.

In the constructional example according to Figs. 6-9, the first portion of the casing consists again of a number of tubes 13 corresponding to the number of slots, and the second portion of the casing consists of temporarily open trough-shaped end chambers 12 and 14. The slot tubes 13 open into these end chambers in a water-tight manner. The encasing layer may be made of an insulating or elastic material, or of a material which becomes elastic on warming, such as cellon or vulcanized rubber. The end portions 22 and 24 which constitute the temporarily open end chambers 12 and 14 may be, as shown in Fig. 7, constructed in the form of open circular troughs or discs, the edges of which are joined water-tight after the completion of the winding operation. In this manner a hollow cage is produced which is closed on all sides and which forms a liquid-tight casing for the coil.

The edges of the troughs constituting the end chambers may be joined also by means of a separate insert. The advantage of this arrangement is that the closure of the edges may be readily removed. In the case where an elastic insulating covering is employed, the edges of the two channels constituting the end chambers may be shifted apart during the winding process, so that the end connections are freely accessible from all sides. It is thus possible to carry out the winding as with open motors, that is to say that the end connections can be bound, lacquered and reinforced as required. At the conclusion of the winding operation, the motor is impregnated and dried out in the usual way. Thereupon the edges of both chambers 12 and 14 are bent together, and are joined together water-tight, possibly through the agency of a separate insert.

With this construction, it is possible to test the imperviousness of the insulating covering by means of a small pressure of air. For this purpose, the edges of the chambers 12 and 14 are bent together, and are pressed against one another in an airtight manner by means of a clamp 19, shown at the top of Fig. 6. Air is introduced through tubes 16 and 17 joined to the end chamber 12. At the end of a satisfactory test for imperviousness, the clamp 19 is then removed, the edges of the chambers are shifted apart, and the winding is carried out. If the notches of the motors are closed the container must be inserted before the second end chamber is connected with the tubes 13. In other words, in such motors having closed notches a container is mounted on the stator which consists of the tubes 13 and one end chamber (e. g. 14). The second end chamber 12 will be joined with the tubes in a water-tight manner, e. g. by vulcanizing, only after the tubes 13 have been pulled through the notches, whereupon the winding is inserted.

With motors with half-open slots, the insulating covering may be constructed separately from the motor and tested by means of an air pressure for imperviousness outside the motor. The tubes 13 are then, as shown in Fig. 9, slightly flattened and inserted through the slits of the slots.

Cellon or semi-vulcanized or vulcanized rubber constituting the insulating casing is so flexible that the shape of the casing ends may be varied within wide limits. However, care must be taken to avoid excessive stretching when the shape is thus changed.

The end chamber 14 is provided with a tube 18 for the lead to the winding, which leads in a liquid-tight manner into a terminal box (not shown) arranged on the motor.

The air spaces within the insulating casing may be filled up with a suitable material or with rubber whereby the mechanical strength and water-tightness of the container is improved.

I claim:

1. A liquid-tight closure for the stator windings of submersible electric motors having stators with slots therein, comprising a liquid-tight housing completely enclosing the winding for itself, said housing consisting of a plurality of tubular bodies corresponding in number to and located in the stator slots, and housing portions for receiving the end connections of the motor, said portions being connected liquid-tight with the tubular bodies whereby the housing forms a complete liquid-tight closed cage in which the windings are embedded.

2. In a liquid-tight stator winding for submersible electric motors; a liquid-tight casing entirely surrounding the winding, said casing consisting of a plurality of tubes corresponding in number to that of the stator notches, said tubes projecting through the stator notches, and of portions surrounding the end connections; and liquid-tight joints between said tubes and portions, whereby a fluid tight cage is provided for the windings.

3. A liquid-tight stator winding according to claim 2, and in which said portions consist of open troughs, and means for closing the ends of said troughs liquid-tight.

4. A liquid-tight stator winding according to claim 2, and in which said portions consist of open troughs, and means for pressing together the edges of said troughs at certain points.

5. A liquid-tight stator winding according to claim 2, and in which said portions consist of troughs, a tube opening into one of said troughs, and enclosing current supply wires for the winding, and a water-tight connection between said last mentioned tube and the terminal box mounted on the motor.

MICHAEL SURJANINOFF.